United States Patent

[11] 3,623,804

| [72] | Inventor | Francis F. Spreitzer<br>4415 W. 62nd St., Los Angeles, Calif. 90043 |
|---|---|---|
| [21] | Appl. No. | 768,641 |
| [22] | Filed | Oct. 18, 1968 |
| [45] | Patented | Nov. 30, 1971 |

[54] MICROFILM PROJECTOR APPARATUS
24 Claims, 4 Drawing Figs.

[52] U.S. Cl. ............................ 353/77, 353/76, 353/101
[51] Int. Cl. .......................................... G03b 21/28
[50] Field of Search ........................ 353/77, 79, 76, 26, 98, 99, 101

[56] References Cited
UNITED STATES PATENTS

| 1,951,054 | 3/1934 | Kennedy | 353/79 |
|---|---|---|---|
| 2,053,073 | 9/1936 | Gardner | 353/44 |
| 2,332,810 | 10/1943 | Place | 353/76 |
| 2,407,009 | 9/1946 | Holbrook | 353/79 X |
| 2,456,296 | 12/1948 | McDill | 353/101 X |

FOREIGN PATENTS

| 54,402 | 10/1949 | France | 353/77 |
|---|---|---|---|
| 57,031 | 8/1952 | France | 353/79 |
| 586,508 | 1/1925 | France | 353/66 |
| 902,331 | 12/1944 | France | 353/79 |
| 572,528 | 10/1945 | Great Britain | 353/76 |

Primary Examiner—Harry N. Haroian
Attorney—Sellers and Brace

ABSTRACT: Microfilm projector apparatus having closely spaced viewing and writing surfaces shrouded by a lightshielding hood open only across the front face thereof. The projector, rotatable about its own axis to orient the image for most convenient viewing, is concealed from view beneath the viewing surface and projects the image through a small area of that surface onto an inverting mirror. Movement of the image-carrying film strip in either direction is regulated by a single knob controlling a variable-speed reversible motor drive for the film feed.

PATENTED NOV 30 1971
3,623,804
INVENTOR
FRANCIS F. SPREITZER
ATTORNEYS
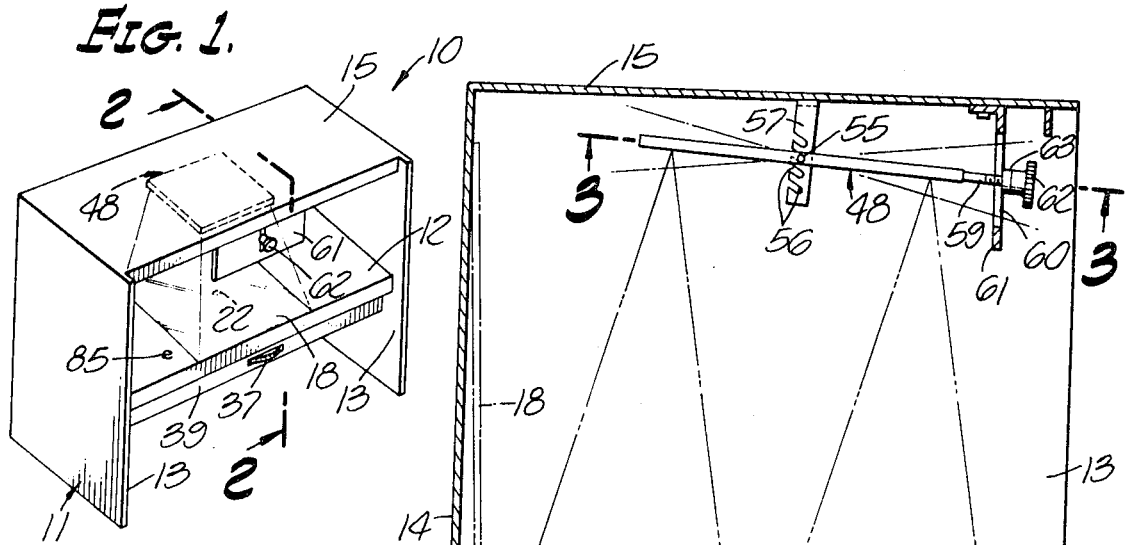
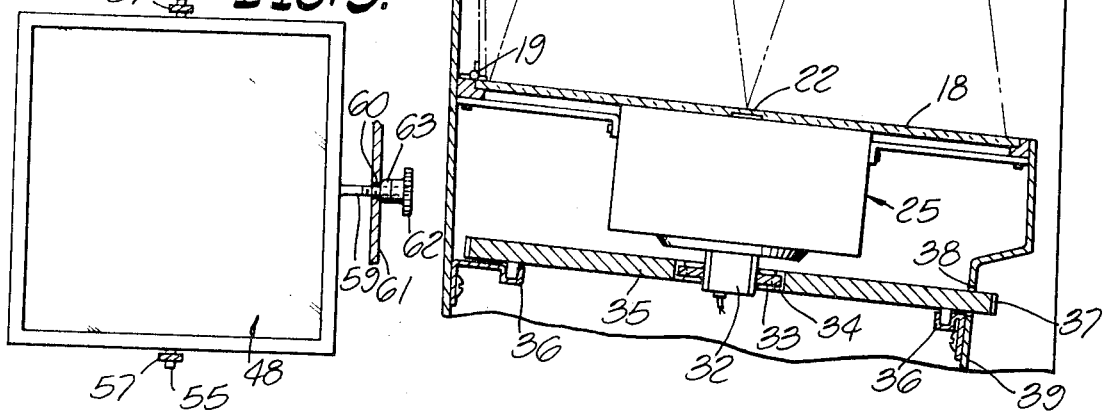
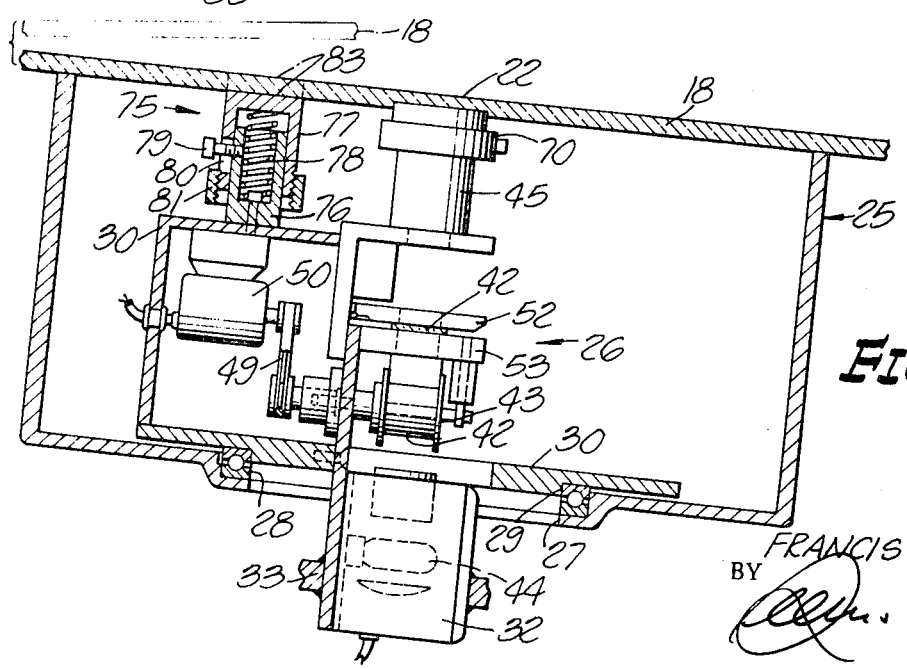

MICROFILM PROJECTOR APPARATUS

This invention relates to microfilm projection equipment and more particularly to an improved, highly efficient means for projecting microfilm images in a shrouded convenient viewing position from a fully concealed projector and featuring a single control for regulating film feed and speed in either direction.

Prior microfilm-exhibiting equipment is subject to numerous shortcomings and disadvantages from mechanical, functional and esthetic viewpoints. Desirably, the equipment should be usable with high efficiency in well-lighted rooms such as those found in properly illuminated public library reading rooms. My copending application for U.S. Letters Pat., Ser. No. 710,110 filed Mar. 4, 1968 for Microfilm Display Apparatus overcomes serious objections to prior display equipment but is subject to certain minor objections fully obviated by the present invention. In this prior construction, the projector is partially exposed in a recess at one end of the counter or writing surface. This arrangement interferes objectionably by restricting the available writing space and, under certain conditions, movements of the operator intercept the light beam from the projector thereby blocking the projection beam and causing sharply contrasting changes in illumination of the surface being viewed by the user.

The present invention provides improved display equipment of the same general type as that disclosed in my aforementioned copending application, but eliminating certain inconveniences and disadvantages deemed by some users as present in the earlier disclosure.

In the present invention the image display surface is flush with a conveniently arranged counter top providing a large, unobstructed writing surface conveniently located on either side of the display surface. The projector itself is concealed from view and located centrally beneath the display surface, the light beam from the projector passing upwardly through a transparent section of the display surface onto an overhead reflecting device and thence back onto the viewing surface. Only the controls are exposed to view, one of these serving to rotate the projector to orient the image and the other being shiftable in either direction in variable amounts as requisite to regulate the direction and speed of the motor driving the film feed. Access to the projector is obtained by lifting the image display plate, whereupon the projector as a unit is removable from a rotary turntable by means of which the projector is rotatable about the axis of its light beam. The reflecting mirror is also adjustable at the user's option to vary the magnification of the image as well as to shift it forward or backward on the viewing surface for greater visibility and convenience in reading the same. Another expedient permits the user to focus the projector accurately by lifting a part of the viewing surface to gain access to the focusing control while using another part of the image display surface to adjust the focus control.

Owing to the arrangement of the projector and viewing surface in close proximity to but below the writing surface, the designer is enabled to resort to a wide range of housing designs and to achieve maximum esthetic effects without restriction or need of expedients to conceal mechanical equipment.

Accordingly, it is a primary object of this invention to provide an improved, simple, easily operated, highly efficient microfilm viewing apparatus substantially all components of which are concealed from view.

Another object of the invention is the provision of a microfilm-viewing apparatus having the appearance of an article of furniture and having a reading and writing surface flush with an image display surface serving additionally to conceal an underlying projector arranged to project the image through the viewing surface before being reflected back thereonto.

Another object of the invention is the provision of a microfilm-viewing apparatus designed as a pleasing article of furniture and featuring a reading and writing surface within a light-shielding shroud and having a projector unit rotatable about its own axis beneath the table top onto which the image is cast by reflector means.

Another object of the invention is the provision of a microfilm reader having a projector supported for bodily rotation about the axis of its light beam.

Another object of the invention is the provision of a microfilm reader having a display surface between selectably usable writing surfaces at tabletop level and on generally the same plane as the viewing surface.

Another object of the invention is the provision of a microfilm reader having an image display surface generally normal to the image projection beam and located closely adjacent the forward end of the projection lens system.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of an illustrative embodiment of the invention;

FIG. 2 is a fragmentary, vertical sectional view taken along line 2—2 on FIG. 1;

FIG. 3 is a fragmentary sectional view taken along line 3—3 on FIG. 2; and

FIG. 4 is an enlarged fragmentary vertical sectional view taken generally along the projection axis of the projector.

Referring more particularly and initially to FIG. 1, there is shown a typical embodiment of the present invention designated generally 10. This view shows as esthetically pleasing housing 11 suitable as a piece of furniture and designed to harmonize pleasingly with other furnishings commonly found in offices, drawing rooms, public reading rooms and the like, and provided with a counter or reading surface 12 supported between upright end walls 13, 13, rear wall 14, and a top wall 15. A center panel 18 of any suitable material is hinged at 19 to the rear wall of the cabinet an its surface is treated to provide an image-receiving and reflecting surface. The portion of counter 12 to either side of the image-reflecting panel 18 is preferably sufficiently large to provide a writing surface of ample size for either a left- or right-handed user. The only portion of panel 18 which is not treated to provide an image-reflecting surface is a small diameter circle 22 directly overlying the projector and through which the image-conveying light beam passes. If desired, this circle may comprise an opening through the panel but, preferably, clear glass covers the objective lens of the projector and serves to guard the lens from dirt and foreign matter.

Underlying hinged panel 18 is a supporting framework or housing 25 for supporting and housing the projector proper designated generally 26. Housing 25 is provided with a large diameter opening 27 in its bottom equipped with an antifriction bearing assembly 28, the upper ring of which nests snugly about a shoulder 29 formed on projector main frame 30. The axis of bearing ring 28 is normal to panel 18 and coincides with the projection axis of projector 26. In consequence, it will be recognized that the projector may be rotated as a unit at least through 90° in either direction from its normal operating position for the purpose of orienting the image in a convenient reading position on panel 18. Thus, a drawing, photograph, table or other matter on the film arranged lengthwise of the filmstrip can be rotated so that its image extends crosswise of the viewer on panel 18.

To facilitate rotation of the projector, its lamp housing 32 is shown as equipped with a toothed ring 33 which mates with teeth 34 formed about the inner rim edge of an adjusting ring 35. This latter ring is supported on rollers mounted in brackets 36 secured to housing 11 beneath panel 18. Rim 37 of ring 35 projects through a slotlike opening 38 formed in flange 39 projecting downwardly from the forward edge of counter 12. It will be understood that adjusting ring 35 remains seated on the rollers in brackets 36 at all times but permits upward withdrawal of projector 26 from the antifriction bearing assembly 28 whenever the projector is in need of servicing.

The unitary projector assembly 26 may be of any suitable construction, such as that disclosed and described in my aforementioned copending application. It will be understood that film 42 is mounted on supply and takeup spools 43,43 with the intervening portion passing past the aperture of gate 53. Light from the high-intensity lamp 44 passes through the film and projects an image therefrom through the projection lens assembly 45, through the transparent portion 22 of panel 18, thence onto a reflecting mirror 48 best shown in FIG. 2. The supply and takeup spools 43 are located on either side of the light beam and are suitably driven by a belt 49 connected with a reversible, variable-speed motor 50 secured to main frame 30 of the projector. A plate of glass 52 hinged to the main frame bears lightly against film 42 and holds it pressed flat and firmly across the projector gate assembly 53.

Reflecting mirror 48 has a pair of trunnions 55,55 selectively mountable in any pair of a series of slots 56 formed in the edge of a bracket 57 secured to apparatus housing top 15. A threaded shank 59 attached to the forward edge of the mirror extends through a vertical slot 60 of a vertical panel 61 secured to top wall 15 of the main housing. Shank 59 and mirror 48 may be clamped in any desired tilted position along slot 60 by a clamping nut 62 having a rubber washer 63 bearing against the face of panel 61.

Another feature of the invention concerns convenient means to facilitate accurate focusing of the projector on display surface 18. Normally, the focus-adjusting ring 70 of the projector is inaccessible because positioned immediately beneath panel 18. If this full panel is raised to give access to the adjusting ring, then the panel surface is unavailable to receive the image while adjusting the focusing ring. According to one construction for dealing with this problem, panel 18 may be formed in two parts by a line of severance extending crosswise of counter 12. Hence, one-half may be lifted to give access to adjusting ring 70 while the other half remains available for viewing the image as the ring is being adjusted.

Alternatively, a retractable focusing accessory may be used of the general type designated generally 75 in FIG. 4. This accessory comprises a tubular pedestal 76 rigidly secured to main frame 30 and over which is loosely telescoped a thimble 77 urged upwardly by a light compression spring 78. A stop pin 79 threaded into pedestal 76 is located in a slot 80 of thimble 77 and holds the latter in assembled position. A threaded adjusting ring 81 rotatably supported along the lower end of thimble 77 provides an adjustable stop cooperating with pin 79 to limit the upward movement of member 77 so that its exterior end surface 83 lies flush with the normal surface of panel 18. Thus, when ring 81 is properly adjusted, its surface 83 will come to rest precisely flush with the normal operating position of the upper surface of panel 18. Accordingly, it will be understood that the focusing adjustment is made by lifting panel 18 to its open position whereupon member 77 automatically moves to its extended position with surface 83 flush with the normal position of the image display surface. The operator then proceeds to adjust the focusing ring 70 until the portion of the image falling on surface 83 is in sharp focus. The operator then lowers panel 18 automatically shifting member 77 back to its retracted position.

The operation of the described microfilm display apparatus will be readily apparent from the foregoing detailed description of its components and their operative relationship to one another. The projector is loaded with film in the usual manner after first lifting panel 18 to provide access to the projector. The projector may be lifted from bearing ring 28 during the loading process if desired and then simply dropped back into position, care being taken to make certain that toothed ring 33 meshes with the teeth of adjusting ring 35 (FIG. 2). Before restoring panel 18 to its closed position, the operator may check to make certain that the projector lens 45 is in focus by viewing the image thrown onto surface 83 of the supplemental image display member 77. This having been done, panel 18 is closed and equipment is ready for use.

The film is advanced in either direction past gate 53 by the use of control knob 85 (FIG. 1). It will be understood that this control knob can be rotated in either direction from its "off" or "null" position and controls the polarity and amount of energizing current supplied to film-drive motor 50. If knob 85 is turned to the right, the film is advanced forward slowly and with increasing speed as knob 85 is advanced clockwise. If the film is advanced slightly too far, this error is corrected by turning the knob slightly counterclockwise to reverse the motor 50 at slow speed, the knob being returned to its neutral or "off" position when the film is precisely in position.

The image is, of course, projected through opening 22 onto mirror 48 which reflects the image onto the main display surface provided by panel 18.

If the viewer experiences difficulty in reading matter on the rear edge of the viewing panel, he may shift the image toward him by manipulating clamping knob 62 and then moving this knob upward slightly along slot 60 to tilt mirror 48, thereby throwing the rear portion of the image closer to the forward edge of the panel. Likewise, the image may be made larger or smaller by loosening nut 62 and then shifting mirror 48 to a different pair of notches 56.

If an image thrown on surface 18 is oriented in the wrong direction, the operator merely engages the knurled rim of control ring 37 with his thumb and rotates this ring 90° in one direction or the other until the image is properly oriented, this operation serving to rotate the projector as a whole on turntable-bearing assembly 28 about the axis of projection lens 48.

While the particular microfilm projector apparatus herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. Microfilm-reading apparatus comprising: means providing a large area image display surface for the material to be read, image reflector means facing toward but spaced forwardly of said image display surface, microfilm projector means located rearwardly of said image display surface with its image projection axis passing centrally through a small area window therethrough in an area located within the perimeter of the image reflected thereon from said image reflector means, and means for shifting the reflected image on the image-reading surface to facilitate reading the portion of the image previously pierced by the projection light beam.

2. Reading apparatus as defined in claim 1 characterized in the provision of means supporting said image display surface in a convenient viewing position for a viewer while seated thereadjacent.

3. Reading apparatus as defined in claim 1 characterized in the provision of means supporting said image display surface generally horizontally adjacent writing surface means convenient to a viewer seated along one edge of said display surface.

4. Reading apparatus as defined in claim 1 characterized in the provision of light-shrouding means enclosing said image display surface except along the forward edge thereof.

5. Reader apparatus as defined in claim 1 characterized in that said image display surface means includes first and second surfaces the first of which receives a portion only of the image from said projector means and the second of which is movable to a position providing the viewer with access to image-focusing means on said projector means and located behind said image display surface, and said second surface being movable to a position giving the viewer access to a focusing adjustment for said projector while the viewer observes the image on said first image display surface to determine when the projector is properly focused.

6. Reader apparatus as defined in claim 5 characterized in that said first image display surface is supported normally in a retracted nonoperating position, and means operatively associated with said first image display surface to shift said surface into the normal image-receiving plane of said second surface when said second surface is moved out of its normal position to provide access to the focusing means of said projector.

7. Reader apparatus as defined in claim 6 characterized in that said first image display surface is spring-biased toward a stop position flush with the normal plane of said second image display surface whereby movement of said second display surface to a position giving access to the projector-focusing adjustment allows said first display surface to move automatically into position and enabling the user to focus the image accurately thereon.

8. Reader apparatus as defined in claim 6 characterized in that the return movement of said second display surface to the normal position is effective to shift said first display surface to the retraction position thereof.

9. Reader apparatus as defined in claim 6 characterized in the provision of manually adjustable means for adjusting the focusing position of said first display surface to lie flush with the normal operation of said second display surface thereby assuring that proper focusing of the projector on said first display surface will also be correct for said second display surface.

10. Reader apparatus as defined in claim 1 characterized in the provision of means supporting said projector for rotary movement about its projection axis.

11. Reader apparatus as defined in claim 10 characterized in the provision of control means conveniently positioned for use by the viewer to rotate the projector about its axis to orient the image in any desired position on said image display surface.

12. Reader apparatus as defined in claim 9 characterized in the provision of control means for rotating said projector in either direction about the axis thereof.

13. Reader apparatus as defined in claim 1 characterized in that said means for shifting the reflected image includes means for shifting the position of said image reflector means over a range of different positions.

14. Reader apparatus as defined in claim 13 characterized in the provision of means for anchoring said image reflector means in a desired adjusted position.

15. Reader apparatus as defined in claim 14 characterized in that said anchoring means includes means for supporting said image reflector means at different focal distances from said projector to vary the size of the projected image.

16. Reader apparatus as defined in claim 14 characterized in that said anchoring means includes means moving said image reflector means in a manner to shift the image closer to and away from the viewer for convenience in viewing a selected area of the image.

17. Reader apparatus as defined in claim 1 characterized in the provision of manually actuated control means for shifting the image transversely of the viewer to facilitate reading the portion of the image previously pierced by the projection light beam.

18. Reader apparatus as defined in claim 1 characterized in the provision of means concealing said projector from view behind said image display surface.

19. Reader apparatus as defined in claim 1 characterized in that said image display surface includes a transparent disc coaxially of the projector axis and through which the film image is projected and onto said display surface surrounding and generally coplanar with said transparent disk.

20. In combination, microfilm apparatus having a counter supported generally horizontally at a convenient working height for a seated viewer, a shroud supported above said counter and closed except across the front side thereof, microfilm projector means concealed below said counter with its projection axis passing upwardly through light-transmitting means generally centrally of an image-receiving surface on the upper face of said counter, and means including reflector means supported beneath the top side of said shroud positioned to reflect the image from the projector on said counter in the area surrounding the image-projecting light beam and for shifting the image on said image-receiving surface as necessary for reading all portions thereof.

21. The combination defined in claim 20 characterized in that said projector includes reversible motor-driven means for moving strip film crosswise of the projection path of said projector, and single control means for said motor operable to control the direction and speed of said motor depending upon the direction and magnitude of movement of said control means from the deenergized null position thereof.

22. Microfilm reader apparatus comprising a unitary projector assembly for strip film, means providing an image display surface in the path of the light beam of said projector, said image display surface having a window barely large enough to pass the projector light beam, adjustable light-reflecting means positioned in the path of the light beam after passing through said window and effective to reflect the same onto different areas of said display surface all of which surround said window, and means rotatably supporting said projector about the axis of the light beam emanating therefrom and effective to orient the image in a proper viewing position on said display surface.

23. Reader apparatus as defined in claim 22 characterized in that said rotatable support includes antifriction bearing means, and said projector having nesting support in said bearing means and normally separable therefrom by lifting the same out of nested assembly therewithin.

24. Reader apparatus as defined in claim 23 characterized in that said image display surface means is positioned closely adjacent said projector and transversely of the image-projecting beam emanating therefrom.

* * * * *